United States Patent
Heller et al.

(10) Patent No.: US 6,722,615 B2
(45) Date of Patent: Apr. 20, 2004

(54) WING TIP EXTENSION FOR A WING

(75) Inventors: Gerd Heller, Hausen (DE); Manfred Maisel, Markdorf (DE); Peter Kreuzer, Gilching (DE)

(73) Assignee: Fairchild Dornier GmbH, Wessling (DE)

( * ) Notice: Subject to any disclaimer, the term of this patent is extended or adjusted under 35 U.S.C. 154(b) by 0 days.

(21) Appl. No.: 10/116,875

(22) Filed: Apr. 5, 2002

(65) Prior Publication Data
US 2002/0162917 A1 Nov. 7, 2002

(30) Foreign Application Priority Data
Apr. 9, 2001 (DE) .......................... 101 17 721

(51) Int. Cl.$^7$ ................................. B64C 5/08
(52) U.S. Cl. ................. 244/199; 249/45 R; 249/91
(58) Field of Search .............. 244/35 R, 124, 244/45 R, 119, 218, 210, 198, 199, 91; D12/319, 343, 345

(56) References Cited

U.S. PATENT DOCUMENTS

| | | | | |
|---|---|---|---|---|
| 1,710,673 A | * | 4/1929 | Bonney | 244/215 |
| 2,123,096 A | * | 7/1938 | Charpentier | 244/35 R |
| 3,270,988 A | * | 9/1966 | Cone, Jr. | 244/35 R |
| 3,778,926 A | * | 12/1973 | Gladych | 244/35 R |
| 4,190,219 A | * | 2/1980 | Hackett | 244/199 |
| 4,949,919 A | * | 8/1990 | Wajnikonis | 114/127 |
| 5,039,032 A | * | 8/1991 | Rudolph | 244/124 |
| 5,348,253 A | * | 9/1994 | Gratzer | 244/199 |
| 5,407,153 A | * | 4/1995 | Kirk et al. | 244/199 |
| 5,634,613 A | * | 6/1997 | McCarthy | 244/199 |
| 6,089,502 A | * | 7/2000 | Herrick et al. | 244/35 R |
| 6,484,968 B2 | * | 11/2002 | Felker | 244/91 |

FOREIGN PATENT DOCUMENTS

FR 444080 * 5/1912 ............... 244/45 R

OTHER PUBLICATIONS

Boeing MD–80 Specification, http://www.boeing.com/commercial/md–80/product.html.*

* cited by examiner

*Primary Examiner*—Peter M. Poon
*Assistant Examiner*—Timothy D. Collins
(74) *Attorney, Agent, or Firm*—Scully, Scott, Murphy & Presser

(57) ABSTRACT

The present invention relates to a wing tip extension (7) for a wing, having an upper and a lower surface (10 and 11) and a leading edge and a trailing edge (12 and 13), the geometries of which are such that between a connection region (8), for connection with a wing, and the tip (9) of the wing tip extension (7) there is provided a continuous increase of the local dihedral, a continuous increase both of the sweepback angle of the leading edge (12) and also of the trailing edge (13), and a continuous decrease of the chord of the wing tip extension (7), and in that the wing tip extension (7) in the connection region (8) carries on from the wing in substance continuously. The wing tip extension (7) in accordance with the invention thereby ensures a significant reduction of the overall drag.

20 Claims, 8 Drawing Sheets

WING TIP EXTENSION FOR A WING

The present invention relates to a wing tip extension for a wing, in particular for an aircraft wing.

Winglets or wing tip extensions for wings, in particular for aircraft wings, are known from the state of the art and serve to reduce and to minimize the induced drag arising at the wings when flying, which drag is brought about by the wake vortices at the wing ends. The drag of an aircraft wing of a passenger or transport aircraft in cruise flight is determined to a certain proportion through the so-called induced drag of the aircraft wing. This induced drag is brought about through a change of flow at the wing ends. The flow is deflected inwardly on the wing upper side and outwardly on the wing lower side. The cause of this is the pressure difference between upper and lower sides, which can equalize only at the wing tips. From this there arises a wake vortex which consumes considerable energy, that is causes drag. This wake vortex depends largely upon the geometry of the wing. The induced drag is thereby inversely proportional to the so-called aspect ratio, the ratio of the square of the span to the area of the wing. An increase of the aspect ratio therefore leads to a reduction of the induced drag. The increase of the aspect ratio has, however, other disadvantageous effects, such as for example an increase of the structural weight and an increase of the bending moments.

The configuration of a wing tip extension for a wing thus requires the optimization of a plurality of different and partly conflicting conditions. An important parameter is for example the sweep or sweepback angle of the wing and of the wing tip extension. Greater sweepback angles mean, as a rule, more favorable transonic characteristics during flight. A further factor to be taken into account is the frictional drag, which increases with increase of the area of the wing flowed over. Further, slow flight characteristics are significantly influenced by the geometry of the wing and also by wing tip extensions. Since, with increased cruising speeds, the difference between slow flight upon taking off and landing and cruise flight has become greater, means must be found in order to ensure a sufficient lift also in the case of slow flight. For this purpose, for example, leading edge slots and trailing edge flaps on the wing, and leading edge devices on the wing tip extension have been proposed; see for example in U.S. Pat. No. 5,039,032. The provision of additional slots or flaps, however, increases the complexity of the wing or of the wing tip extension considerably. Further, the geometry of the wing tip extension is to be so configured that elastic deformations do not lead to a disadvantageous flow-structure interaction.

It has been sought to provide solutions for various of the above-mentioned requirements by means of wing tip extensions proposed in the state of the art. For example, U.S. Pat. No. 6,089,502 proposes a wing tip extension for supersonic aircraft. The wing tip extension is in substance planar, that is, it extends in the plane of the wing and turns from the wing end strongly to the rear. In the connection region of the wing tip extension to the wings, leading and/or trailing edges have a pronounced sharp bend or kink. U.S. Pat. No. 5,039,032, already mentioned above, likewise proposes a planar wing tip extension for an aircraft wing, with which the sweepback angle of the wing tip extension changes abruptly in comparison to the sweep angle of the wing, in the connection region, so that at least at the leading edge a pronounced sharp bend or kink arises. U.S. Pat. No. 5,348,253 proposes a wing tip extension which uninterruptedly carries on the wing end in a continuous manner by means of a transition region. The transition region is distinguished by a continuous monotonic variation of the cant angle, and there adjoins on to the transition region a straight end region directed from the wing downwardly or upwardly. The sweep angle in the curved transition region thus changes continuously whilst in the end region of the wing tip extension the sweep angle no longer changes, which means that leading edge and trailing edge form straight lines.

The object of the present invention is to provide a wing tip extension for a wing which has a significant reduction of the induced drag and an improvement of the wave drag with only slight increase of the frictional drag in cruise flight without limiting the slow flight characteristics.

This object is achieved by means of a wing tip extension for a wing in accordance with claim 1. The wing tip extension in accordance with the invention has an upper and a lower surface, and a leading and a trailing edge, the geometries of which are of the configuration that between a connection region for connection with a wing and with the tip of the wing tip extension, there are provided a continuous increase in the local dihedral, a continuous increase both of the sweepback angle of the leading edge and also of the trailing edge, and a continuous decrease of the chord of the wing tip extension, and in that the wing tip extension in the connection region carries on from the wing in substance continuously.

The wing tip extension in accordance with the invention thus ensures a reduction of the aerodynamic drag through a significant reduction of the induced drag, and an improvement of the wave drag with only slight increase of the frictional drag in cruise flight, without limiting the slow flight characteristics. The continuous increase of the sweep angle of the leading edge and of the trailing edge and the continuous increase of the local dihedral lead to a non-planar curved geometry. The continuous increase of the local dihedral thereby provides the non-planarity, that is the bending of the wing tip extension out of the plane of the wing upwardly or downwardly, while the continuous increase of the sweep angle, in a view from above the wing tip extension, has the consequence of a curvature to the rear. Through the resulting increased aspect ratio and the non-planarity there is achieved significant reduction of the lift dependent induced drag. The uniform and continuous change of the above-mentioned parameters thereby makes possible an efficient realization of the isobar concept for reduction of the wave drag. Because of the continuous increase of the sweep angle of the leading edge and of the trailing edge, and the increase of the relative nose radius, the slow flight capabilities are not substantially affected, so that the provision of additional leading edge slots on the wing tip extension is not necessary. The significant tapering of the wing tip extension resulting from the increase of the sweep angle of the leading edge and of the trailing edge reduces the additional friction brought about by the additional area of the wing tip extension to an acceptable level.

An important feature of the wing tip extension in accordance with the invention is the configuration of the connection region such that there results a substantially continuous union with the wing concerned. There are thus edges and kinks or sharp changes neither in the connection of the upper and the lower surfaces of the wing tip extension with the corresponding surfaces of the wing, nor between the leading and trailing edges. By means of the continuous transition there is achieved a largely elliptical circulation distribution along the span of the wing, which has as a consequence a significant reduction of the induced drag. Also for transonic characteristics it is of advantage that the span-wise distributed parameters have a continuous and smooth development. Here, the continuousness of the increase of the local dihedral is in particular decisive. A bending of the wing tip extension which is as gentle and continuous as possible, that is a continuous increase of the local dihedral, has a very favorable effect on flight in the transonic region. By means of the configuration of the wing tip extension in accordance with the present invention, in particular through the harmonic continuation of the wing geometry and the simple geometry of the wing tip extension, compressibility effects are reduced to a minimum. The harmonic configuration of the wing tip extension, that is the continuousness of the significant geometrical and span-wise distributed parameters, through the consequently harmonically distributed aerodynamic forces and moments, make possible a significantly weight reduced structural realization. Further, aeroelastic effects are reduced to a minimum by means of the geometrical configuration in accordance with the invention.

Advantageous configurations of the wing tip extension in accordance with the invention are indicated in the subclaims. Advantageously, the overall height of the wing tip extension is 30 to 60% of the span of the wing tip extension. Additionally to the above discussed geometrical parameters it is of advantage if the relative profile thickness of the wing tip extension continuously decreases from the connection region to the tip. This measure has effect particularly for improvement of the transonic characteristics. In this case it is of advantage if the reduction of the relative profile thickness from the connection region towards the tip is more than proportional to the span. In other words, the reduction of the relative profile thickness is advantageously not directly proportional to the span of the wing tip extension, but increases towards the tip. Thereby the relative profile thickness can be reduced from 100% in the connection region to 70%–85% at the tip.

Further, in addition to the above-discussed geometrical parameters, it is of advantage if the relative radius of the nose at the leading edge continuously increases from the connection region towards the tip, that is in comparison with the span a more than proportional increase takes place. Further it is of advantage if the relative radius of the nose at the leading edge continuously increases from 100% in the connection region to 200 to 300% at the tip.

Advantageously, the increase of the dihedral from the connection region to the tip is more than proportional to the span. In other words, starting from the connection region, the dihedral varies first slowly and then ever more strongly towards the tip. Here, it is of advantage when the local dihedral increases from about 0✤ to 10✤ in the connection region up to 45✤ to 60✤ in the tip.

Also in relation to the sweep angle it is of advantage when the increase of the sweep angle of the leading edge, from the connection region to the tip, is more than proportional to the span. The sweep angle varies first slowly and then ever more strongly towards the tip. Advantageously, the sweep angle of the leading edge increases from between 25 to 45✤ in the connection region up to 70✤ to 80✤ in the tip.

Also in relation to the chord it is of advantage when this reduces, from the connection region to the tip, more than proportionally to the span. Here, the chord may reduce from 100% in the connection region to 10 to 20% in the tip.

The wing tip extension in accordance with the present invention can be formed either as an add-on part for a wing or as part of the wing. That is, the wing tip extension in accordance with the invention can be conceived either as an add-on part for an existing wing or can already be included in the basic concept at the beginning of the development of an aircraft.

Advantageously the span of the wing tip extension is between 8 and 12% of the half-span of the wing. Further, the wing tip extension in accordance with the invention is advantageously designed for a speed range between 0.6 and 0.95 Mach. Further it is of advantage if the wing tip extension in accordance with the invention is designed for wing having a sweep angle between 25 and 45✤.

The wing tip extension in accordance with the invention will be described in more detail below with reference to the accompanying drawings, in which there is shown FIG. 1 a view from above of an aircraft having wing tip extensions in accordance with the present invention at the wing ends, FIG. 2 a view from the front of the aircraft shown in FIG. 1, FIG. 3 a view from the front, to an enlarged scale, of a wing tip extension in accordance with the present invention, FIG. 4 a view from above of the wing tip extension shown in FIG. 3, FIG. 5 a side view of the wing tip extension shown in FIGS. 3 and 4, FIG. 6 a diagram giving a general illustration of the variation of the geometrical parameters of the wing tip extension in accordance with the invention, with reference to the span, FIG. 7 a diagram giving an illustration of the variation of the leading edge sweepback angle with reference to the span, for a wing tip extension in accordance with the present invention, FIG. 8 a diagram giving an illustration of the variation of the chord distribution with reference to the span, for a wing tip extension in accordance with the present invention, FIG. 9 a diagram giving an illustration of the variation of the relative profile thickness with reference to the span of a wing tip extension in accordance with the present invention, FIG. 10 a diagram giving an illustration of the variation of the local dihedral with reference to the span of a wing tip extension in accordance with the present, invention, FIG. 11 a diagram giving an illustration of the variation of the relative nose radius with reference to the span of a wing tip extension in accordance with the present invention.

Figure 1:
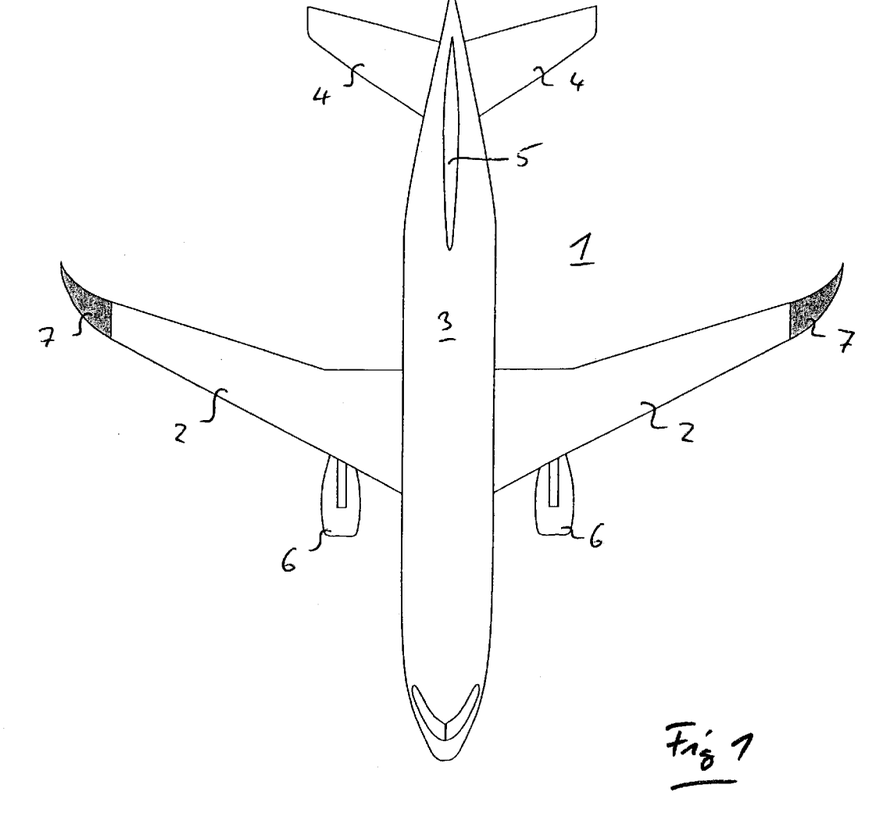
Figure 2:
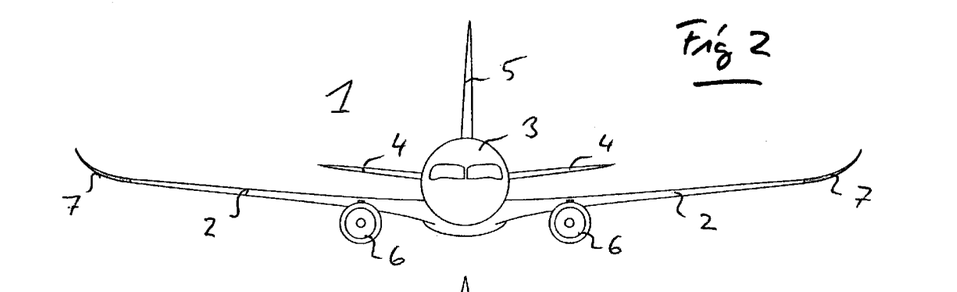

FIG. 1 shows, in a view from above, an example of an aircraft 1 having lifting surfaces or wings 2, a body 3, rear horizontal stabilizers 4, a tail 5, and engines 6 arranged beneath the wings 2 close to the body. The illustrated construction corresponds to that of a medium size passenger aircraft having swept back wings 2 in the region of 25✤ to 45✤. FIG. 2 shows the aircraft 1 shown in FIG. 1 in a view from the front.

At the ends of two wings 2 there is in each case arranged a wing tip extension 7 in accordance with the invention. The wing tip extensions 7 are in their geometry in each case so adapted to the corresponding wing 2 that the important geometrical parameters form a continuous union at the wing ends. Thereby, each wing tip extension 7 is formed as a non-planar curved wing tip extension (NCW Non-planar Curved Winglet) which in each case represents a non-planar and curved extension of the associated wing 2 such that all span-wise distributed parameters of the wing tip extension 7 continuously carry on from the wing end and develop continuously, monotonically and without kinks up to the tip of the wing tip extension, as is illustrated in general in FIG. 6 for the variation of the parameters with the span.

Figures 3, 4, 5:
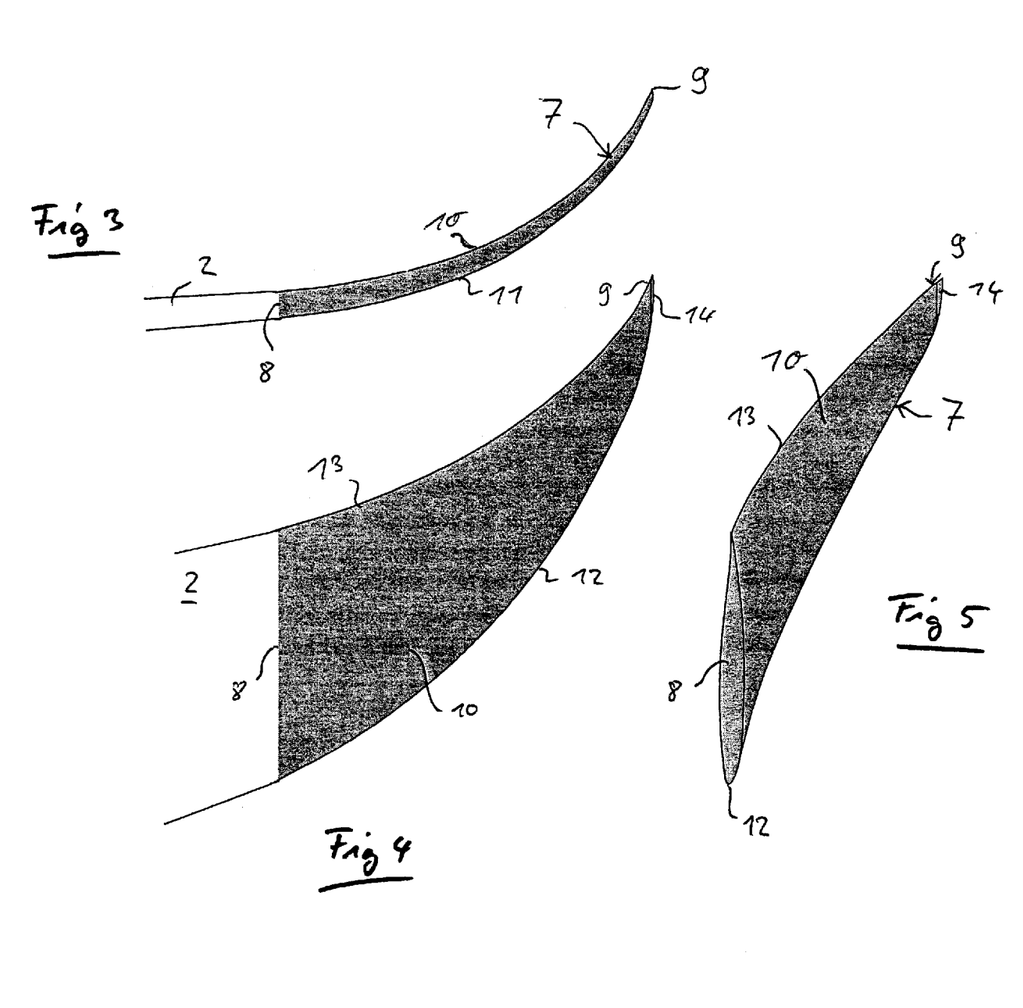
Figure 7:
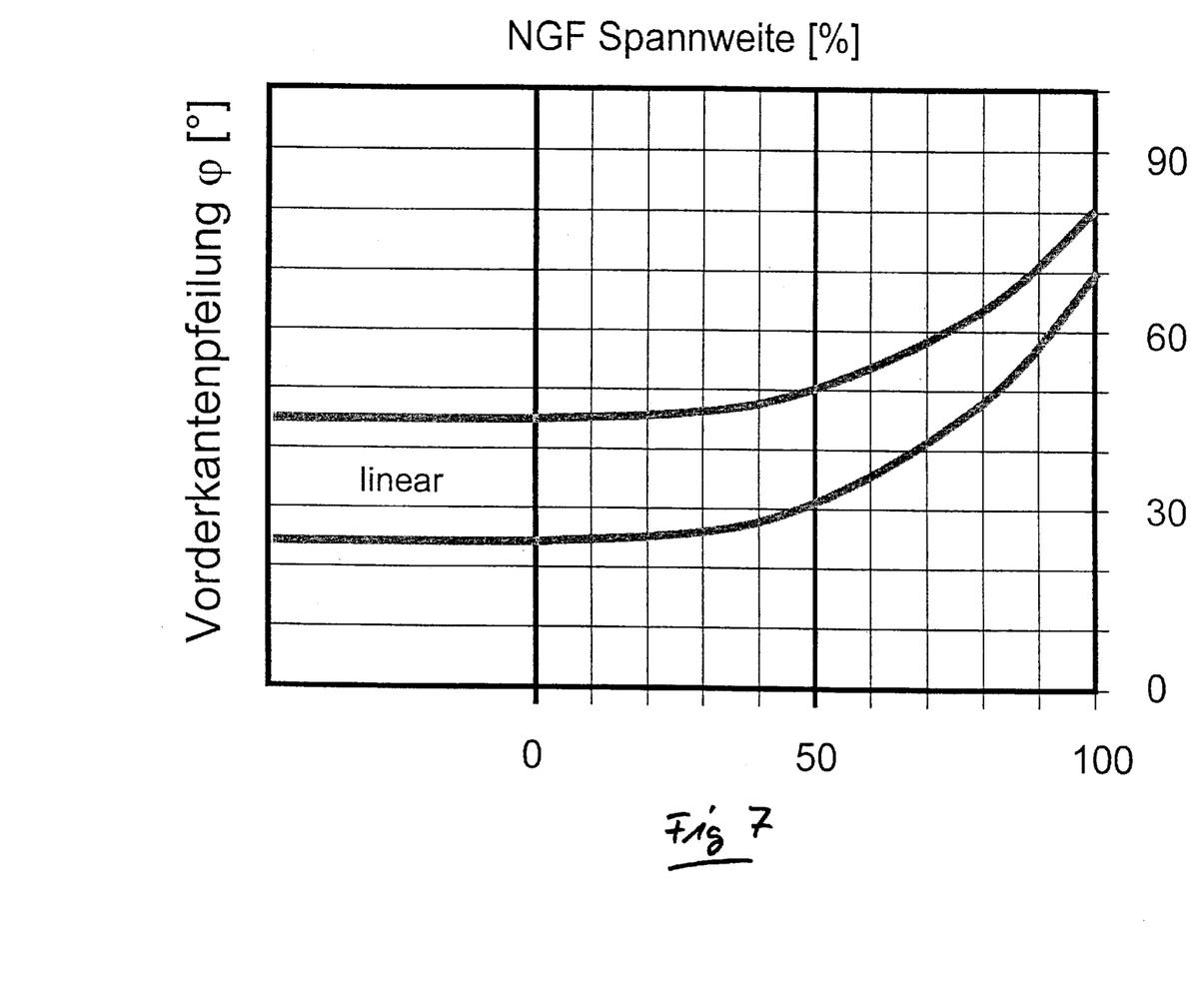
Figure 8:
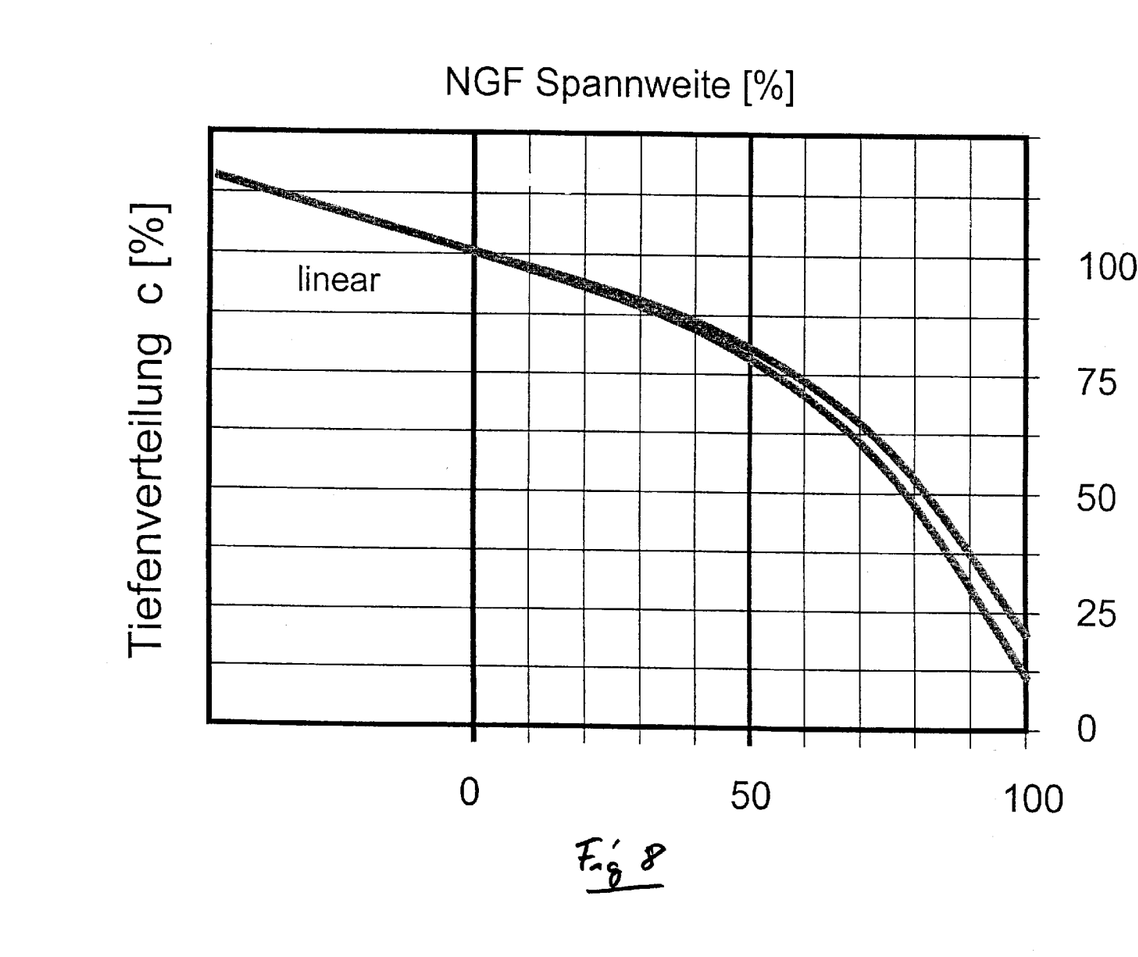

In FIGS. 3, 4 and 5 the wing tip extension 7 in accordance with the invention is illustrated to a larger scale, FIG. 3 providing a view from the front, FIG. 4 a view from above, and FIG. 5 a side view. The wing tip is extension 7 in accordance with the invention adjoins the end of the wing 2 with a connection region 8, that is with a profile cross-section towards the wing, and extends to the tip 9, at which a wing tip fairing 14 may be provided. The wing tip extension 7 is in substance formed of an upper surface 10 and a lower surface 11, which are connected by means of a leading edge 12 and a trailing edge 13. As can be seen in FIG. 4, the leading edge 12 and the trailing edge 13 of the wing tip extension 7 carry on the respective sweepback angles of the leading edge and the trailing edge of the wing 2, without a kink, in a continuous manner. Between the connection region 8 and tip 9 the sweepback angle of the leading edge 12 and of the trailing edge 13 in each case increases continuously, so that in the view from above a curvature of the wing tip extension 7 to the rear is provided with relatively strong tapering at the tip 7. As can be seen from the diagram of FIG. 7, which indicates the advantageous range of the leading edge sweepback angle with reference to the span of the wing tip extension 7, the sweepback angle of the leading edge increases from 25✤ to 45✤ in the connection region 8 up to 70 to 80✤ in the tip 9. Thereby it is assumed that the wing 2, for which the wing tip extension 7 in accordance with the invention is formed, has a constant leading edge sweepback angle of about 25✤ to 45✤. The increase of the leading edge sweepback angle is thereby more than proportional with reference to the span; that is, the increase of the sweepback angle is stronger towards the tip 9. The increase of the sweepback angle of the trailing edge 13 of the wing tip extension 7 is lesser in comparison with the increase of the sweepback angle of the leading edge 12, so that there is provided the strong convergence and the tapering of the two edges 12 and 13 as is to be seen in FIG. 4. The continuous reduction of the chord of the wing tip extension between the connection region 8 and the tip 9 can likewise be recognized in FIG. 4 and is illustrated in the diagram of FIG. 8, which shows the chord distribution with reference to the span. As can be recognized from FIG. 8, the chord reduces between the connection region and the tip more than proportionally to the span, whereby the strong tapering in the region of the tip 9 is provided. The reduction of the chord may thereby, as is shown in FIG. 8, be a reduction from 100% in the connection region 8 to 10 to 20% in the tip 9.

Figure 10:
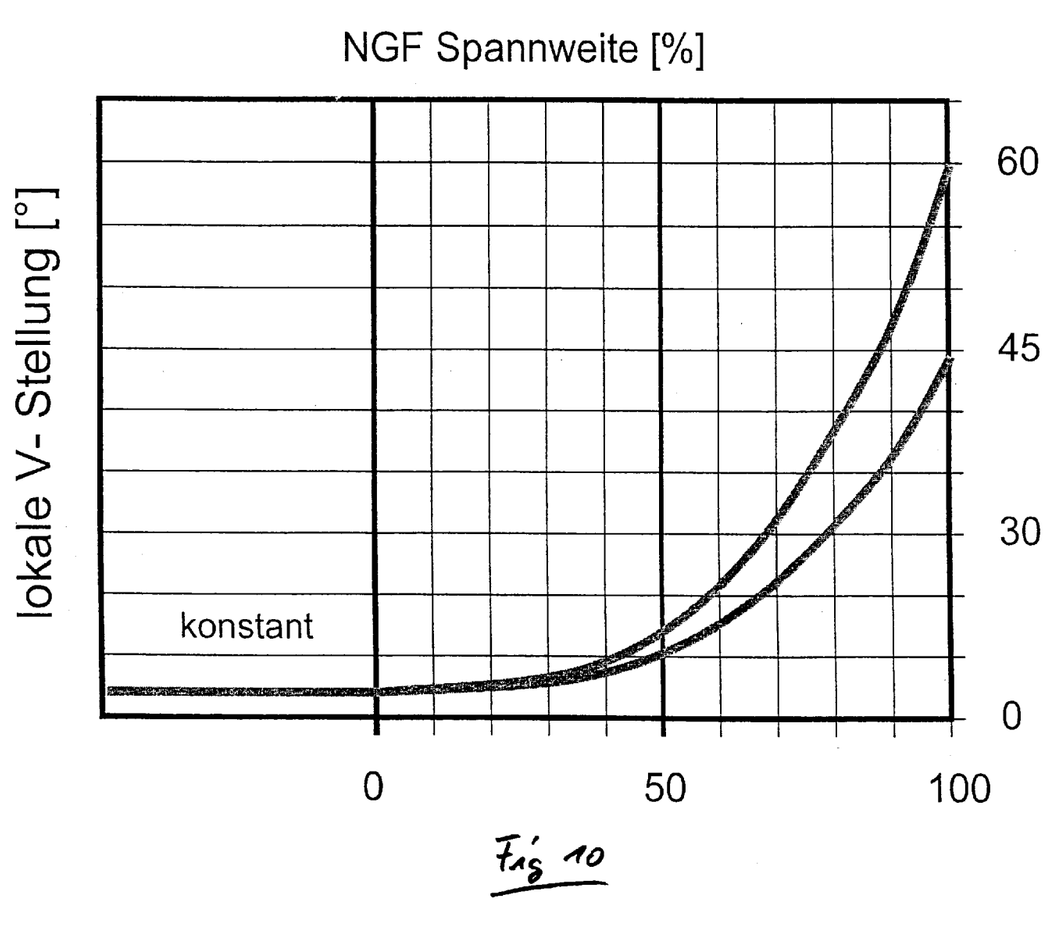

In FIG. 3, the continuous increase of the local dihedral of the wing tip extension 7 in accordance with the invention can be well recognized. In general, the dihedral shape or dihedral disposition of the wing 2 of an aircraft may be positive or negative, depending upon the required stability and the intended purpose of the aircraft. As can be recognized in FIG. 2, the illustrated aircraft 1 has a positive dihedral of the wing 2, which is typical for passenger and transportation aircraft. By means of the wing tip extension 7 in accordance with the invention the local dihedral of the wing end 2 in the connection region 8 is carried on in a continuous manner and without kink, and then continuously increases towards the tip 9, whereby the non-planarity and bending of the wing tip extension 7 upwardly is provided. As is illustrated in the diagram of FIG. 10, which illustrates the local dihedral disposition with reference to the span, the local dihedral may increase from 0✤ to 10✤ in the connection region 8 to 45✤ to 60✤ in the tip 9. The increase of the local dihedral is thereby more than proportional to the span, that is the increase is stronger towards the tip 9. The total height of the wing tip extension 7 then amounts to about 30 to 60% of the span of the wing tip extension.

Figure 9:
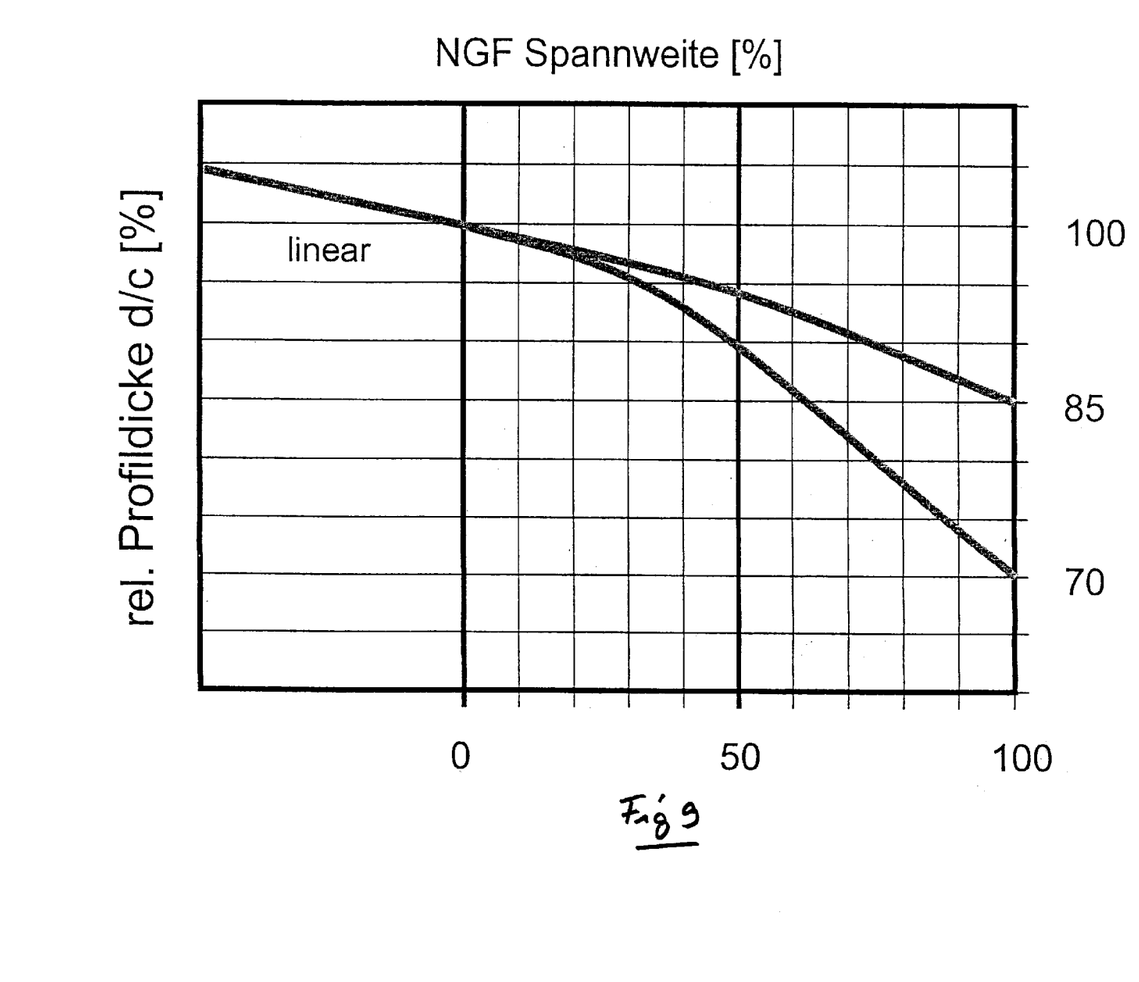

As can also be recognized in FIG. 3, the relative profile thickness of the wing tip extension 7 in accordance with the invention continuously decreases from the connection region 8 towards the tip 9. The relative profile thickness is thereby defined as the ratio of the absolute profile thickness to the profile chord. FIG. 9 shows a diagram of the relative profile thickness with reference to the span, whereby it can be recognized that the decrease of the relative profile thickness is more than proportional to the span; that is, is stronger towards the tip. As illustrated, the relative profile thickness decreases from 100% in the connection region 8 to 70 to 85% in the tip 9. The reduction of the relative profile thickness of the wing 2 from the body to the end of the wing is thereby approximately linear, that is proportional to the span.

Figure 11:
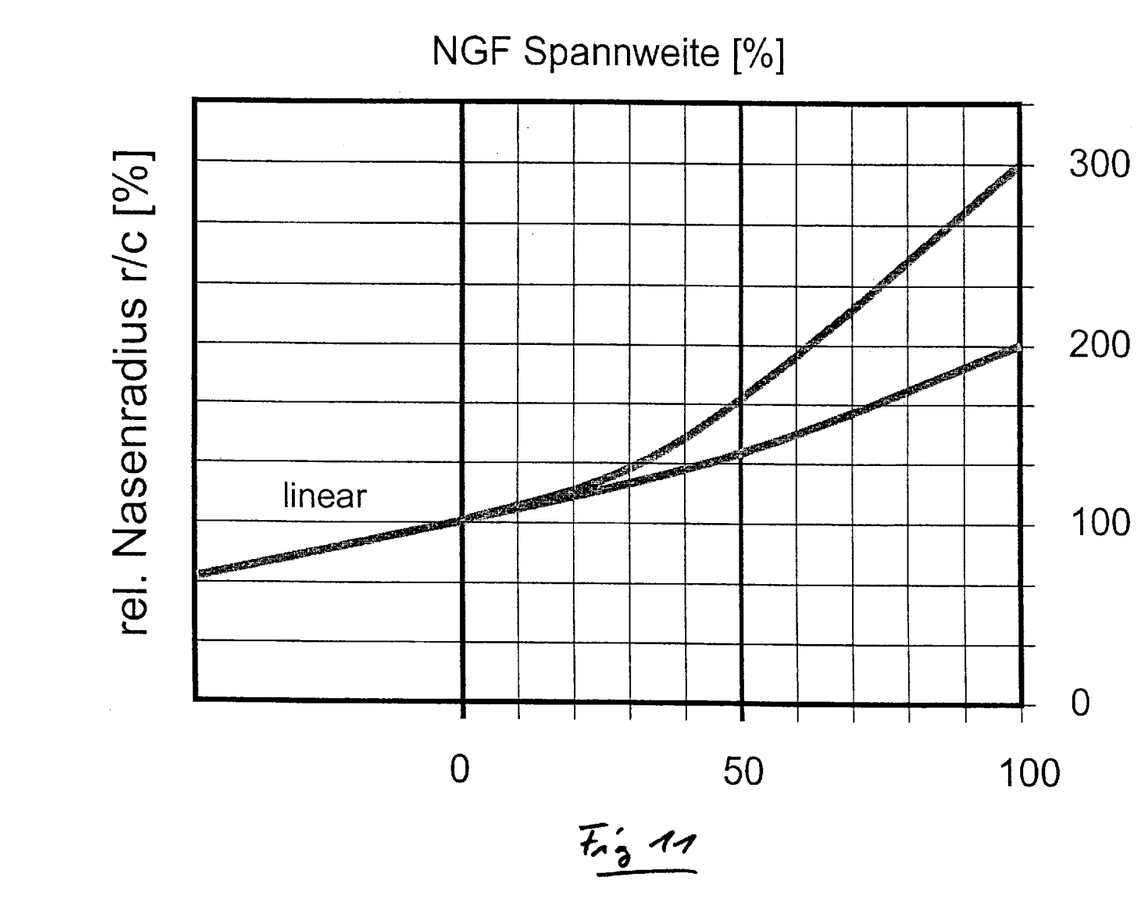

Further, the relative radius of the nose on the leading edge 12 continuously decreases from the connection region 8 to the tip 9. The relative nose radius is defined as the ratio of the absolute nose radius to the profile chord. As is illustrated in the diagram of FIG. 11, which illustrates the relative nose radius with reference to the span, the linear increase of the relative nose radius at the leading edge of the wing 2 in the connection region 8 of the wing tip extension 7 is carried on in a continuous manner, whereby the increase of the relative nose radius in the wing tip extension 7 is more than proportional to the span; that is, is greater towards the tip 9. Thereby, the relative nose radius continuously increases from 100% in the connection region 8 to about 200 to 300% at the tip 9.

Further geometrical parameters, such as for example the twist or warp of the wing 2, are likewise carried on by the wing tip extension 7 in the connection region 8 continuously and without kink and configured in accordance with the requirements for an optimum lift distribution. It is further to be emphasized that the airfoil shape of the wing tip extension 7 follows, in the flow direction, the shape of the wing end and carries this on in a continuous manner, without being subjected to topological changes. The span of the wing tip extension 7 is advantageously about 8 to 12% of the half-span of the wing 2. Further, the wing tip extension 7, as is illustrated in the Figures and described, is configured in advantageous manner for a speed range of 0.6 to 0.95 Mach. The wing tip extension 7 in accordance with the invention may thereby be configured as a add-on component for a wing 2, or may be integrated from the beginning of aircraft development in the basic concept, and integrated into the wings.

Figure 6:
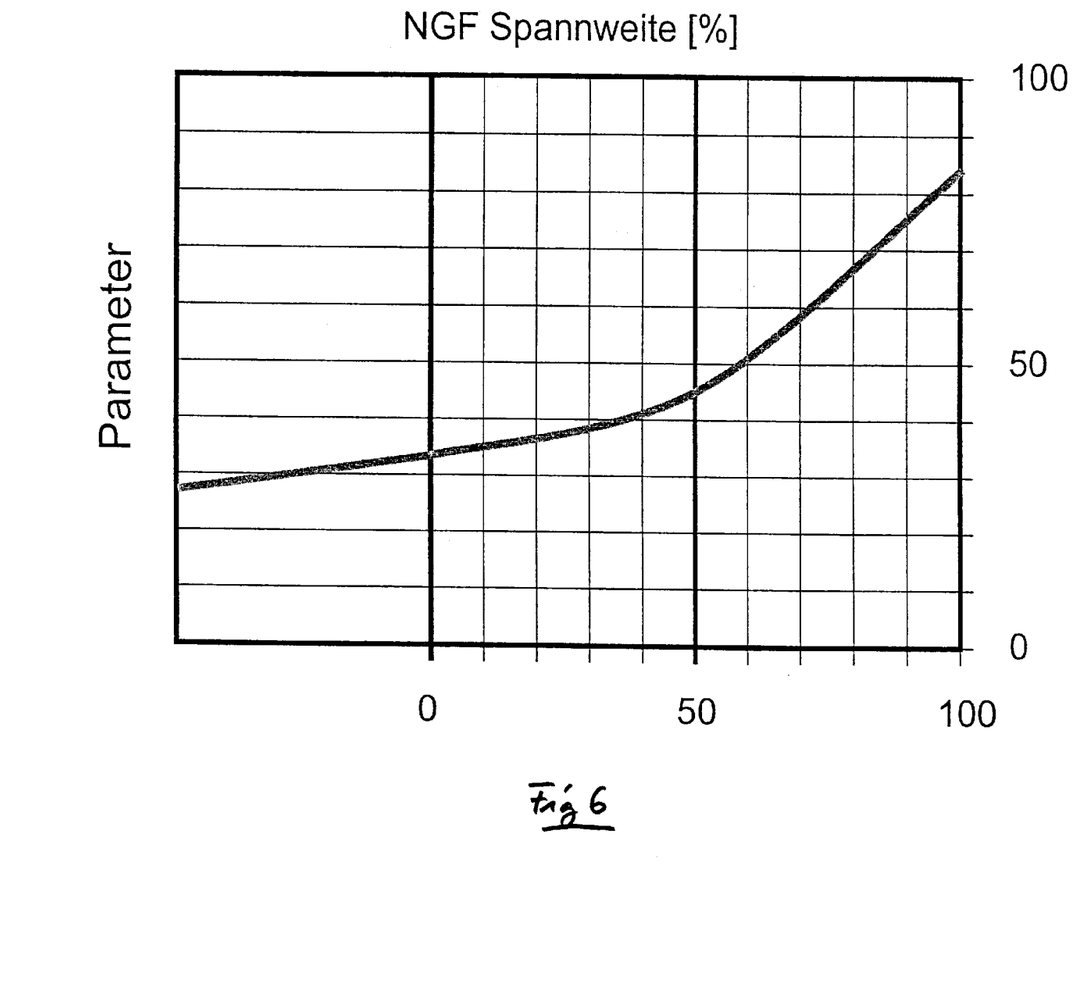

In summary, the non-planar curved wing tip extension 7 in accordance with the invention is so geometrically configured that the significant span-wise distributed parameters, in particular the local dihedral, the sweepback angle of the leading edge and of the trailing edge, and the chord, carry on from the end of the wing concerned in a continuous manner and without kink, and develop harmonically and continuously between connection region 8 and tip 9 of the wing tip extension 7, as can be seen in FIG. 6. The wing tip extension 7 in accordance with the invention thus carries on the corresponding parameters of the wing 2, taking these over, and is determined by these in the geometric configuration. The configuration in accordance with the invention thereby ensures a circulation distribution which is elliptical in the ideal case, whereby a minimization of the induced drag is attained. In particular by means of the non-planarity of the wing tip extension 7 in accordance with the invention this effect is promoted. A further advantage of the non-planarity is the reduction of the resulting root bending moment. Further, by means of the harmonic continuation of the geometrical parameters of the wing 2 and the simple topology of the wing tip extension 7, compressibility effects are reduced to a minimum. By means of the continuous increase of the leading edge sweepback angle, the tendency to leading edge flow separation is strongly weakened, so that no additional devices such as slats or leading edge flaps are necessary. The harmonic configuration of the wing tip extension 7 in accordance with the invention allows as a consequence of the likewise harmonic and continuously distributed aerodynamic forces and moments a structural realization with a significant reduction in weight. Further, aeroelastic effects are reduced to a minimum by means of the geometric configuration of the wing tip extension 7.

What is claimed is:

1. Wing tip extension (7) for a wing, having an upper and a lower surface (10 and 11) and a leading edge and a trailing edge (12 and 13), the geometries of which are such that between a connection region (8), for connection with a wing, and the tip (9) of the wing tip extension (7) there is provided a continuous increase of the local dihedral, a continuous increase both of the sweepback angle of the leading edge (12) and also of the trailing edge (13), and a continuous decrease of the chord of the wing tip extension (7), and in that the wing tip extension (7) in the connection region (8) carries on from the wing in substance continuously.

2. Wing tip extension (7) for a wing, in accordance with claim 1,
    characterized in that,
        the overall height of the wing tip extension (7) is 30% to 60% of the span of the wing tip extension.

3. Wing tip extension (7) for a wing, in accordance with claim 1, characterized in that, the relative profile thickness continuously decreases from the connection region (8) to the tip (9).

4. Wing tip extension (7) for a wing, in accordance with claim 3,
    characterized in that,
        the reduction of the relative profile thickness from the connection region (8) towards the tip (9) is more than proportional to the span.

5. Wing tip extension (7) for a wing, in accordance with claim 3 or 4,
    characterized in that,
        the relative profile thickness decreases from 100% in the connection region to 70% to 85% at the tip.

6. Wing tip extension (7) for a wing, in accordance with claim 3, characterized in that, the relative radius of the nose at the leading edge (12) continuously increases from the connection region (8) to the tip (9).

7. Wing tip extension (7) for a wing, in accordance with claim 6,
    characterized in that,
        the increase of the relative radius of the nose from the connection region (8) towards the tip (9) is more than proportional to the span.

8. Wing tip extension (7) for a wing, in accordance with claim 6 or 7,
    characterized in that,
        the relative radius of the nose at the leading edge (12) continuously increases from 100% in the connection region (8) to 200% to 300% at the tip (9).

9. Wing tip extension (7) for a wing, in accordance with claim 3, characterized in that, the increase of the dihedral from the connection region (8) to the tip (9) is more than proportional to the span.

10. Wing tip extension (7) for a wing, in accordance with claim 9, characterized in that, the local dihedral increases from between 0° to 10° in the connection region (8) up to 45° to 60° in the tip (9).

11. Wing tip extension (7) for a wing, in accordance with claim 3, characterized in that, the increase of the sweepback angle of the leading edge (12) from theconnection region (8) to the tip (9) is more than proportional to the span.

12. Wing tip extension (7) for a wing, in accordance with claim 11, characterized in that, the sweepback angle of the leading edge (12) increases from between 25° to 45° in the connection region (8) up to 70° to 80° in the tip (9).

13. Wing tip extension (7) for a wing, in accordance with claim 3, characterized in that, the reduction of the chord from the connection region (8) to the tip (9) is more than proportional to the span.

14. Wing tip extension (7) for a wing, in accordance with claim 13,
    characterized in that,
        the chord decreases from 100% in the connection region (8) to 10% to 20% in the tip (9).

15. Wing tip extension (7) for a wing, in accordance with claim 3, characterized in that, that it is formed as an add-on component for a wing.

16. Wing tip extension (7) for a wing, in accordance with claim 3, characterized in that, it is formed as a part of a wing.

17. Wing tip extension (7) for a wing, in accordance with claim 3, characterized in that, the span of the wing tip extension (7) is 8% to 12% of the half-span of the wing.

18. Wing tip extension (7) for a wing, in accordance with claim 3, characterized in that, it is contigured for a speed range from 0.6 Mach to 0.95 Mach.

19. Wing tip extension (7) for a wing, in accordance with claim 3, characterized in that, it is configured for a wing having a sweepback angle between 25° and 45°.

20. Wing tip extension (7) for a wing, in accordance with claim 2, characterized in that, the relative profile thickness continuously decreases from the connection region (8) to the tip (9), and the reduction of the relative profile thickness from the connection region (8) towards the tip (9) is more than proportional to the span.

* * * * *